J. R. BAUMANN.
SEGMENT BLOCK.
APPLICATION FILED APR. 6, 1918.

1,349,552.

Patented Aug. 10, 1920.

Inventor
J. R. Baumann

Witnesses:

UNITED STATES PATENT OFFICE.

JOHN R. BAUMANN, OF RED WING, MINNESOTA.

SEGMENT-BLOCK.

1,349,552.     Specification of Letters Patent.     Patented Aug. 10, 1920.

Application filed April 6, 1918. Serial No. 227,093.

*To all whom it may concern:*

Be it known that I, JOHN R. BAUMANN, a citizen of the United States, residing at Red Wing, in the county of Goodhue and State of Minnesota, have invented certain new and useful Improvements in Segment-Blocks; and I do hereby declare the following to be a full, clear, and exact description of the invention, such as will enable others skilled in the art to which it appertains to make and use the same.

The object of the invention is to provide a simple and relatively inexpensive building block, designed for use in the construction of culverts, sewers, arches, silos and the like, whereby a perfect break joint may be established between adjoining elements of a structure, whereby the maximum resistance to external pressure is afforded, whereby the cement or mortar if used in the joint is protected from acids in the contents of the structure, as when used in forming a sewer, whereby a uniform circulation of air throughout the structure is insured, and whereby a lock is established between the adjacent faces of adjoining blocks or members, which must be arranged in operative relation by a sliding movement so as to afford what may properly be termed a ship lap joint.

Further objects and advantages will appear hereinafter, it being understood that changes in form, proportion and details may be resorted to within the scope of the appended claims without departing from the spirit of the invention.

Figure 1:
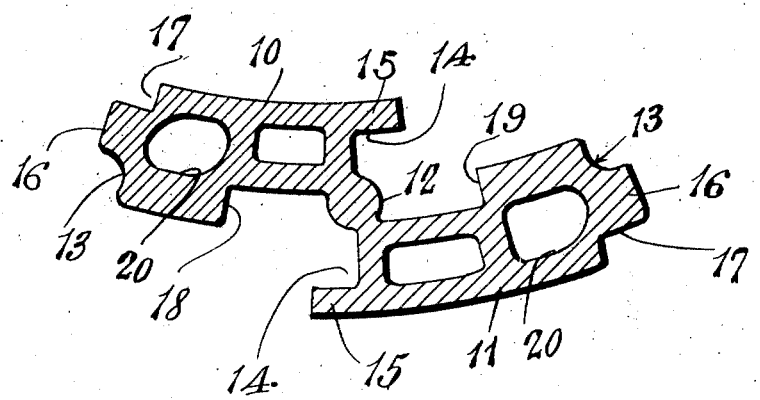
Figure 1 is an edge view of a block constructed in accordance with the invention.
Figure 2:
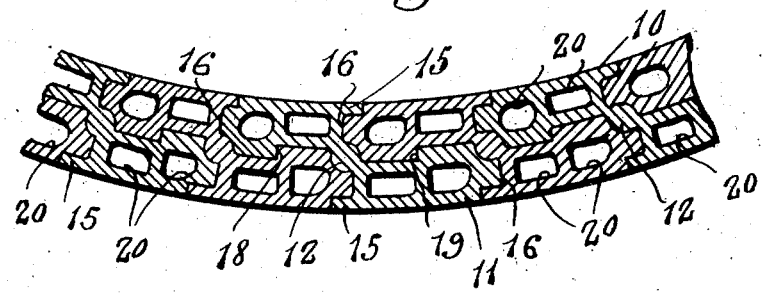
Fig. 2 is a sectional view showing a plurality of blocks arranged in operative relation.
Figure 3:
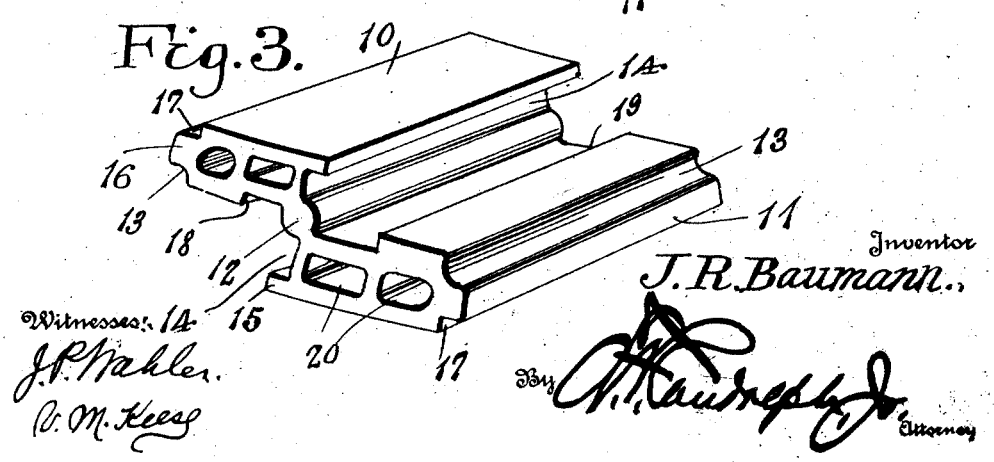
Fig. 3 is a detail view in perspective of one of the blocks.

The block consists essentially of reversely positioned offset members, which for convenience may be termed inner and outer members 10 and 11 which are connected by an obliquely disposed ball web 12 forming rounded faces which correspond with rounded recesses 13 formed in the remote extremities of the members. The adjacent or proximate shoulders of the members are recessed as shown at 14 to provide flanges 15 which overhang the said ball web, transversely, and when the blocks are joined in series, as indicated in Fig. 2, these recesses are occupied by tongues 16 which are formed on the remote extremities of the block members adjacent to the aforesaid rounded terminal recesses 13. The tongues 16 are arranged at intermediate points of the thicknesses of the remote extremities of the members and thus provide angular seats 17 for the reception of the flanges 15 when the blocks are interlocked and arranged in series, and respectively on the outer and inner surfaces of the inner and outer block members 10 and 11 are formed shoulders 18 and 19.

Obviously in order to interlock adjoining blocks it is necessary to place one above the other with the proper portions in registration and then slide one with reference to the other so that the outer extremity of a member of one block will seat within the cavity of the other block which is represented by the space bounded by the shoulder 18, the ball web, the walls of the recess 14 and flange 15, thus bringing the shoulders 18 and 19 into contact or opposition, arranging the rounded recess 13 in engagement with one side of the ball web, disposing the tongue 16 in the recess 14, and receiving the flange 15 in the recess 17. Obviously when such an interlock has been formed, the blocks are held against relative movement other than parallel with the engaging faces, and any cement or mortar which may be used in the joints is effectually cut off from the interior of the structure and therefore is inaccessible to any acids which may be contained therein.

It will be noted furthermore that the interlocking relation thus provided affords a plurality of contacting reinforcing bearing surfaces which serve to effectually resist any relative angular displacement of adjoining blocks, each block having an interlocking relation with the adjoining block at one end both terminally and at an intermediate point. For example, in general outline each member of the block may be regarded as having a reduced inner portion or end and an enlarged outer portion or end, said reduced portions being connected by the aforesaid ball web, and an enlarged terminal of a member of an adjoining block fits in the recess formed by the reduced inner portion of the first named block, while the reduced portion of the said adjoining block receives the enlarged extremity of the approximate member of the first named block, an interlocking relation being established between the extremity of the first named block and the intermediate portion of the adjoining block while there is a corresponding interlocking relation between the extremity of the said adjoining block and the intermediate portion of the first named block. Each block in other words has four distinct interlocking joint relations with the adjoining block with which it comes in contact, and the opposing faces of said adjoining block are so related as to effectually resist both inward and outward and endwise movement in either direction of one block with reference to that with which it is connected.

Obviously the remote or exposed faces of the blocks may be of any desired or preferred contour, and may be either straight or curved, the latter configuration being illustrated in the drawings and being adopted when the device is to be used in the construction of an arched or cylindrical container such as a sewer, culvert or the like.

Moreover, preferably the block members are provided with air spaces 20 as shown therein, and these spaces are so disposed as to be in registration in juxtaposed blocks of parallel courses so that there is a free circulation of air throughout the structure and a consequent avoidance of dead air spaces which would tend to induce the accumulation of moisture. A suitable break joint arrangement between tiers of blocks may be provided by offsetting one tier vertically with relation to the next, as will be readily understood, and by vertically in this connection is meant longitudinally or parallel with the slidably related interlocking faces which determine the relative endwise and lateral positioning of adjoining blocks.

Having thus described the invention, what is claimed is:

1. A building block having reversely positioned relatively offset members connected by an obliquely disposed ball web, the approximate shoulders of said members having outwardly overhung recesses, the oppositely facing sides of said members being shouldered in opposed relation to said recesses, and the remote extremities of said members being provided with tongues for engagement with the corresponding recesses of adjoining blocks and rounded cavities for engagement with the ball webs of said adjoining blocks.

2. A building block having reversely positioned relatively offset members connected by a diagonally disposed web, the approximate shoulders of said members being recessed and having flanges overhanging said recesses, the facing side surfaces of said members being provided with shoulders opposed to said recesses, and the remote extremities of said members being provided with tongues and adjacent recesses for engagement respectively with the recesses and flanges of adjoining blocks.

3. As an article of manufacture, a building block having offset inner and outer members connected by a diagonally disposed web, the approximate ends of said members being reduced in thickness and the remote extremities thereof being enlarged in thickness, the approximate ends of the members having overhanging flanges bounding recesses forming seats for the reception of the enlarged remote extremities of adjoining blocks.

4. A building block having reversely positioned relatively offset members connected by a web, the proximate shoulders formed by the adjacent ends of the members being provided with depressions and the remote ends of the members with tongues to engage the corresponding depressions of adjoining blocks, and the facing or inner side surfaces of said members having other shoulders facing or opposed to said recessed shoulders for engagement with the corresponding shoulders of said adjoining blocks.

5. A block comprising reversely positioned relatively offset first and second members substantially coequal in width, that edge of the first member which is adjacent to the second member having an outer groove defining first inner and outer shoulders, that edge of the second member which is adjacent to the first member being provided with a groove, the grooves forming a thinned neck connecting the members, the opposite edge of the first member being supplied with a tongue defining second inner and outer shoulders, the tongue being adapted to be received in the first-specified groove of an adjoining block, the second shoulders of one block being adapted to coöperate with the first shoulders of an adjoining block, the opposite edge of the second member being provided with a tongue adapted to be received in the groove in the edge of the second member of an adjoining block.

6. A building block for overlapping break joint relation with similar blocks in the same course, the same consisting of similar reversely disposed members meeting at a transverse medial line of the block and each having a wall face surface located on both sides of and equidistant from a longitudinal medial line of the block, and each having transverse inner and outer end surfaces located at different distances from said transverse medial line and provided respectively with male and female interlocking elements.

7. A building block for overlapping break joint relation with similar blocks in the same course, the same consisting of similar reversely disposed members meeting at a transverse medial line of the block and each having wall face surfaces located equidistant from and at opposite sides of a longitudinal medial line of the block, and longitudinal intermediate surfaces respectively having male and female interlocking elements extending oppositely from the longitudinal medial line of the block, and also having transverse inner and outer end surfaces located at different distances from said transverse medial line and provided respectively with male and female interlocking elements.

8. A building block for overlapping break joint relation with similar blocks in the same course, the same consisting of similar reversely disposed members meeting at a transverse medial line of the block and each having wall face surfaces located equidistant from and at opposite sides of a longitudinal medial line of the block, the transverse end surfaces at opposite sides of the longitudinal medial line of each member being located at different distances from the transverse medial line and each having male and female interlocking elements consisting of a tongue and a recess corresponding with and positioned reversely to those of the other.

9. A building block for overlapping break joint relation with similar blocks in the same course, the same consisting of similar reversely disposed members meeting at a transverse medial line of the block and each having wall face surfaces located equidistant from and at opposite sides of a longitudinal medial line of the block, the transverse end surfaces at opposite sides of the longitudinal medial line of each member being located at different distances from the transverse medial line and each having male and female interlocking elements consisting of tongues and recesses corresponding in reverse relation, and the longitudinal intermediate surface of each member having male and female interlocking elements consisting of a tongue and a recess projecting oppositely beyond the longitudinal medial line for engagement respectively with the corresponding oppositely positioned elements of the adjoining blocks.

In testimony whereof I affix my signature in presence of two witnesses.

JOHN R. BAUMANN.

Witnesses:
V. W. LAMBERG,
H. J. STRUSZ.